United States Patent [19]

Guerra

[11] Patent Number: 4,819,583
[45] Date of Patent: Apr. 11, 1989

[54] EXERCISING APPARATUS

[75] Inventor: Gerald T. Guerra, Sandusky, Ohio

[73] Assignee: Lake Erie Welding & Fabricating, Inc., Sandusky, Ohio

[21] Appl. No.: 917,892

[22] Filed: Oct. 10, 1986

[51] Int. Cl.⁴ ............................................. A01K 31/00
[52] U.S. Cl. ...................................................... 119/29
[58] Field of Search ................. 119/29; 198/843, 811, 198/844; 193/35 SS; 272/69

[56] References Cited

U.S. PATENT DOCUMENTS

| | | | |
|---|---|---|---|
| 3,709,197 | 1/1973 | Moseley | 119/29 |
| 4,044,876 | 8/1977 | Hammond | 193/35 SS |
| 4,095,561 | 5/1978 | Ruetenik | 119/29 |
| 4,205,628 | 6/1980 | Null | 119/29 |
| 4,440,295 | 4/1984 | Blackwood-Murray et al. | 198/843 |
| 4,523,674 | 6/1985 | Haugen et al. | 198/843 |

FOREIGN PATENT DOCUMENTS 0876536 10/1981 U.S.S.R. ............................ 198/843

Primary Examiner—Robert Peshock
Assistant Examiner—R. Thomas Price
Attorney, Agent, or Firm—Marshall & Melhorn

[57] ABSTRACT

An exercising apparatus particularly useful for exercising animals including a movable floor, with side walls and cooperating end walls for containing a horse, for example, and comprising an endless belt constituting the movable floor for supporting the horse, a plurality of rollers disposed in supporting relation beneath the portion of the endless belt employed to support the horse, and a yieldable support for the rollers to evenly cushion the impact of the horse's legs during exercise.

10 Claims, 2 Drawing Sheets

EXERCISING APPARATUS

BACKGROUND OF THE INVENTION

The invention relates to an exercising apparatus particularly adaptable and useful for exercising animals, especially horses.

There have been many attempts in the prior art to develop exercising apparatus or treadmills for horses. Typical examples of such apparatus are illustrated and described in U.S. Pat. Nos. 3,689,066, 4,227,487, 4,332,217, and 4,361,115.

One of the ever existing problems not adequately resolved by the apparatus of the prior art concerns the cushioning of the surface on which the horses' hooves contact during exercise. The cushioning requirement is as necessary in dealing with horses' limbs as it is when dealing with human beings. Humans are able, to a large extent, to sufficiently cushion the impact forces occasioned by jogging or running by wearing the corrective type of running shoes. Since running shoes have not found a place in the list of proper attire for horses, it is an objective of the present invention to produce an exercising apparatus for horses wherein the running surface is appropriately cushioned to assist in absorbing impact energy occasioned by the associated horses during exercise.

It is a further object of the invention to produce an exercising apparatus containing a walking or running surface having an adjustable supporting mechanism to control the resiliency or yieldability thereof.

SUMMARY OF THE INVENTION

The above, as well as other objects and advantages of the invention, are typically achieved by an exercising apparatus comprising a frame, first and second spaced apart roller means attached to the frame, an endless belt looped around the roller means, a plurality of supporting roller members disclosed in planar relation between the first and second roller means in supporting relation to the endless belt, and means for yieldingly supporting the supporting roller means.

BRIEF DESCRIPTION OF THE DRAWINGS

The objectives and advantages of the invention will become clearly manifest to one skilled in the art from reading the following detailed description of a preferred embodiment of the invention when considered in the light of the accompanying drawings, in which.

DETAILED DESCRIPTION OF THE PREFERRED EMBODIMENT

Figure 1:
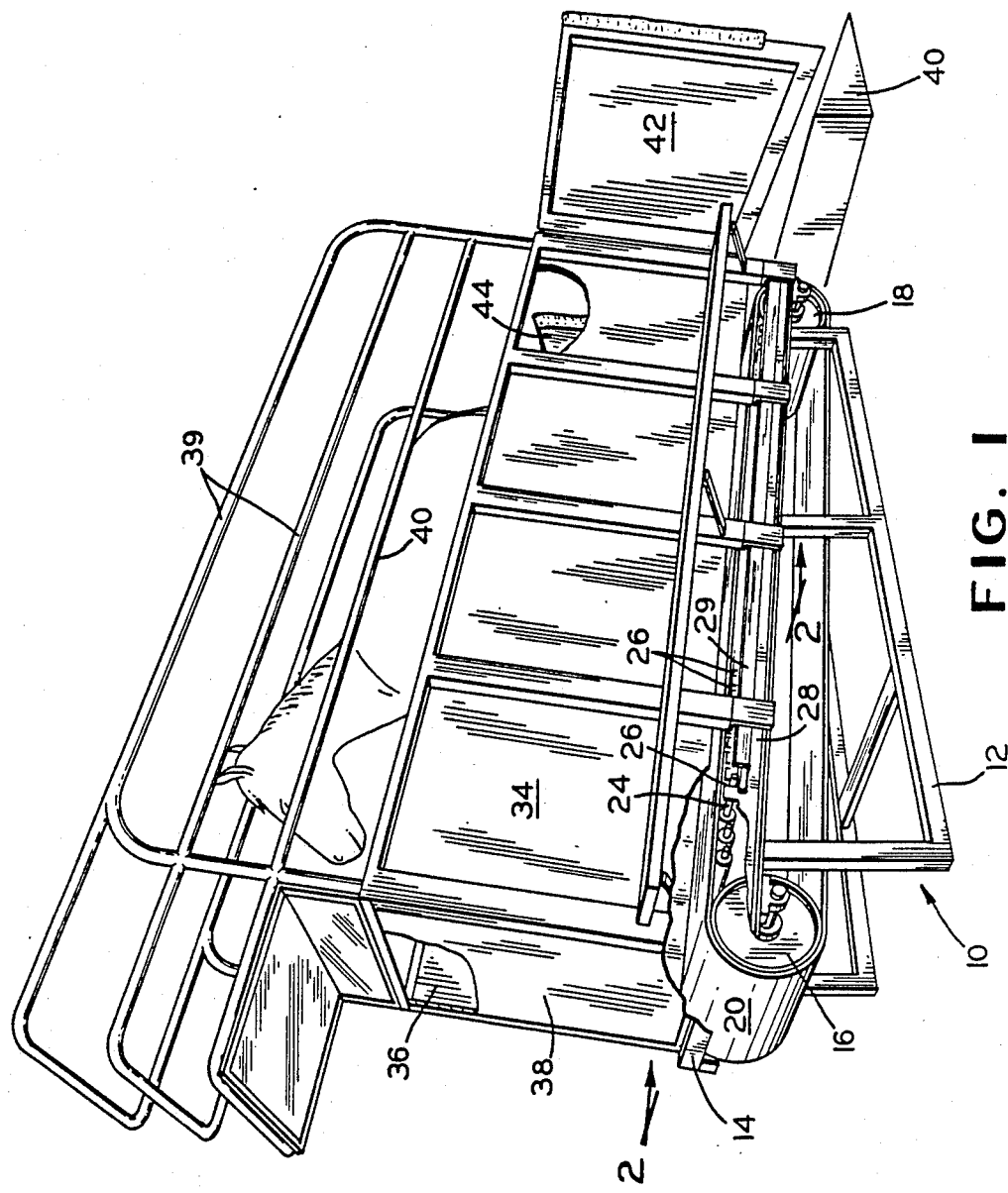
FIG. 1 is a perspective view of an exercising apparatus incorporating the features of the present invention with portions cut-away to more clearly illustrate certain structural features thereof.

Referring to the drawings, there is illustrated an exercising apparatus, including a base frame 10 having a ground engaging portion 12 and an inclined upper portion 14. A pair of rollers 16 and 18 are mounted in a spaced apart relation on the frame 10 preferably to the upper portion. In certain embodiments of the invention, the upper portion 14 of the frame 10 may be selectively angularly adjusted relative to the ground engaging portion 12 to allow for selective inclination of the associated treadmill to be described in greater detail hereinafter.

An endless belt 20 is adopted to extend between and pass over the rollers 16 and 18. Drive means may be employed to drive one or both of the rollers 16 and 18 to move the belt 20 at a selected predetermined speed. It must be understood that the rollers 16 and 18 may likewise function as idlers and be driven by the user of the apparatus as in conventional treadmill structures.

The upper run of the endless belt 20 is adopted to be supported by a plurality of closely spaced apart support rollers 22. The rollers 22 are formed with laterally extending axle members 24 which support the rollers 22 and permit relative rotation therebetween. The terminal portions of the axle members 24 are received within respective spaced apart notches 26 in respective side rail members 28 suitably affixed to opposite sides of the upper portion 14 of the main frame 10. Since the side rails 28 are identical with one another, only a single one is being illustrated and described in detail. The notches 26 permit only vertical movement of the axle members 24 and the associated rollers 22.

The side rail members 28 are formed to contain a length of flexible hose-like material 30 which is typically formed to be conextensive with the array of supporting rollers 22. It will be appreciated that the material 30 is adopted to be supported and confined within a channel defined by section 29, generally an L-shaped crosssection, affixed to the side rail members 28. Interdigitated between the upper surface of the hose material 30 and the axle members 24 of the support rollers 22 are bearing plates 32. The bearing plates 32 typically provide a supporting bearing surface for rotational contact with the axle members 24.

While the flexible hose material 30 may be formed of a material having a sufficient strength and resiliency to provide complete flexible support to the axle members 24 and the associated support rollers 22, it has been found highly desirable in certain instances to couple the hose material 30 to a source of pressure fluid, such as compressed air, for example. In this fashion, the hose member material 30 can be pressurized to any desired degree of pressure to thereby accommodate any desired loading characteristics.

The exercising apparatus of the invention further includes an enclosure formed of a pair of spaced apart side walls 34 and 36 and an interconnecting front wall 38. Typically, the walls 34, 36, and 38 are formed of a sheet metal or the like. A superstructure of tubular metal stock 39 is formed to complete the uppermost portion of the enclosure.

The upper run of the endless belt 20 forms the floor or bottom of the enclosure. An entrance ramp 40 and a pair of oppositely angled entry walls 42 and 44 are provided at the terminal ends of the upper run of the endless belt 20 and the side walls 34 and 36, respectively. The ramp 40 and the cooperating entry walls 42 and 44 provide an easy entryway for an entering horse, for example.

In operation, the aforesaid apparatus is capable of providing a resilient and yieldable supporting surface to relieve any strain on a horse's legs during exercising. More specifically, as soon as the horse has completely entered the enclosure, between the side walls 34 and 36, the endless belt 20 may be caused to be moved in a desired direction by imparting rotary motion to one or both of the rollers 16 and 18. As the horse commences exercising, its hooves essentially contact the upper surface of the belt 20 tending to apply vertical forces downwardly on the belt 20. These forces act downwardly on the associated supporting rollers 22. As these forces act on the rollers 22, the associated axle members 24 tend to urge the bearing plates 32 against the flexible hose 30 tending to compress the material thereof. The compressive energy is then absorbed by the hose material 30. The resultant effect is a resilient and cushioned exercising surface for the horse. In the embodiments of the invention wherein the rollers 16 and 18 are driven, the speed with which the rollers are driven determines the degree of stress imparted to the horse. On the other hand, the powerless embodiments enable a horse to exercise at its own pace.

Also, the degree of stress may be increased or decreased by increasing or decreasing the angle of inclination of the exercising surface. This may be accomplished in any of the well known manners such as by pivotally interconnecting the rear portion of the ground engaging portion 12 and the inclined upper portion 14 of the base frame 10, and providing an adjustable linkage means interconnecting the opposite ends of the portions 12 and 14 to provide for adjustability therebetween to vary the inclination of the upper portion relative to the ground engaging lower portion 12.

Figure 3:
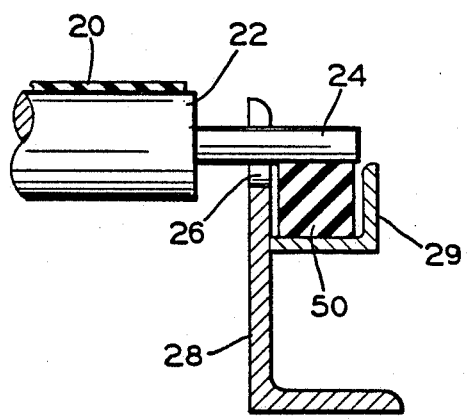
FIG. 3 is an enlarged fragmentary sectional view of another embodiment of the invention.

FIG. 3 illustrates an embodiment of the invention wherein a solid elastomeric member 50 formed of rubber, for example, is employed to cushion the downwardly acting forces imposed by the exercising horse on the belt 20, the associated roller 22 and roller axle 24.

Figure 4:
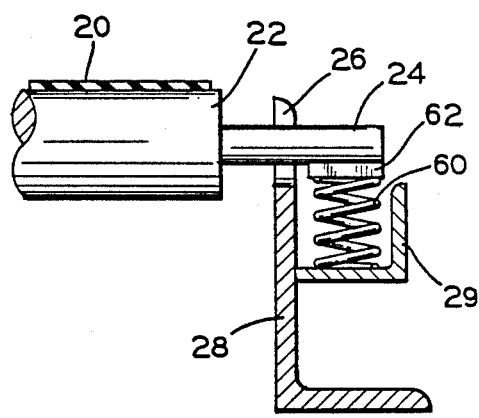
FIG. 4 is an enlarged fragmentary sectional view of still another embodiment of the invention.

FIG. 4 illustrates still another embodiment of the invention wherein a helical spring member 60 and associated bearing plate 62 are positioned in spaced relation along the channel formed by the side rail members 28 and the section 29 to selectively absorb the downwardly acting forces imposed by the exercising horse through the belt 20, supporting rollers 22 and associated axles 24.

Figure 5:
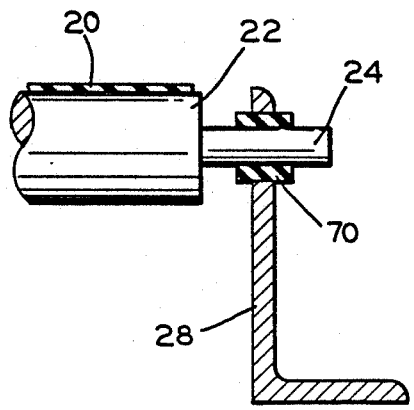
FIG. 5 is an enlarged fragmentary sectional view of another embodiment of the invention.

FIG. 5 illustrates another embodiment of the invention wherein a hollow elastomeric sleeve or grommet 70 is inserted in spaced apart apertures 72 formed in spaced relation along the length of the rail members 28. The laterally extending roller axles 24 are adapted to be inserted with the interior of respective ones of the grommets 70. The grommets 70 function to absorb the downwardly acting forces of the rollers 22 and the associated axles 24.

Figure 2:
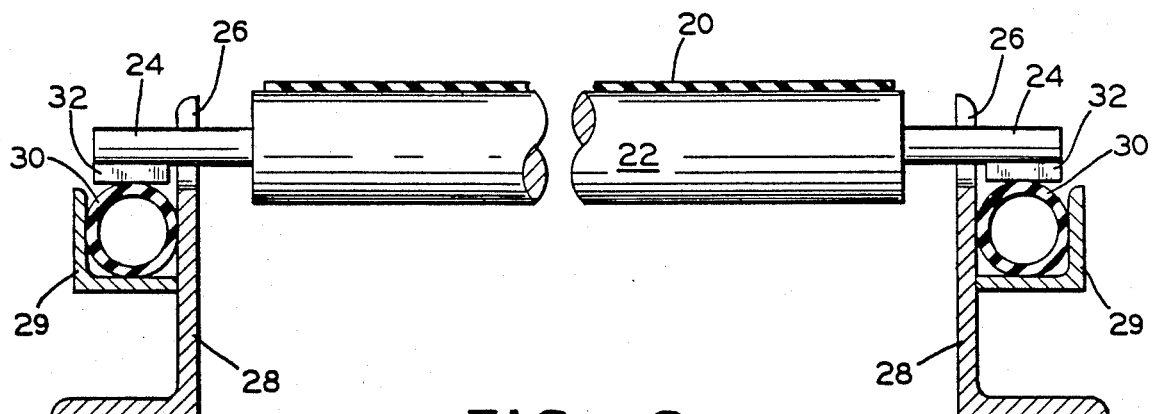
FIG. 2 is an enlarged fragmentary sectional view of the apparatus illustrated in FIG. 1 taken along line 2—2 thereof.

It will be appreciated that various calculations can be made to arrive at the desired loading of the assembly for any desired horse. For example, in considering the embodiment of the invention illustrated in FIGS. 1 and 2, let it be assumed that a fifteen hundred pound horse is to be exercised. At any instant in time the horse will have two hoofs on the ground during exercise. The horse's hoof will typically contact the belt 20 over an area contacting two (2) adjacent supporting rollers 22. Accordingly, assuming the load is relatively evenly distributed, each supporting roller 22 supports approximately 187½ pounds. It has been found that the axle supporting plate 32 has dimensions of 1½ inches by 2 inches, or 3 square inches. Therefore, it would be necessary to preload the supporting hose 30 to at least 60 pounds per square inch. Clearly, this can be readily varied in the embodiment of FIGS. 1 and 2 by selecting an appropriate hose material, or alternatively charging the hose 30 by a suitable source of pressure fluid, such as compressed air.

The aforedescribed invention enables the production of an exercise device which is relatively simple and inexpensive to manufacture and does not require any particularly unique skills to the associated user. The equipment is of rugged structure lending to a long duty cycle with minimum service and repair.

In accordance with the provisions of the patent statutes, the principle and mode of operation of the present invention have been explained and illustrated in its preferred embodiment. However, it must be understood that the present invention can be practiced otherwise and as specifically explained and illustrated without departing from its spirit or scope.

What is claimed is:

1. In an animal exercising device having a movable floor, with side walls and cooperating end walls for containing the animal on the floor, the improvement comprising:
   frame means;
   a first roller means attached to said frame means to rotate about an axis;
   a second roller means attached to said frame means in spaced relation to said first roller means to rotate about an axis parallel to the axis of rotation of said first roller means;
   an endless belt looped around said first and said second roller means, the upper run of said belt comprising said movable floor for supporting the animal;
   a plurality of closely spaced supporting roller means disposed beneath said belt at least in the region thereof defining the movable floor for supporting said animal, each said supporting roller means having stub axles extending from the opposite ends thereof; and
   means yieldably supporting each of the stub axles of said supporting roller means to permit each of said supporting roller means to yield independently of the others and the stub axles at opposite ends of each of said supporting roller means to yield relative to one another to effectively cushion the impact of the weight of the animal during exercise.

2. The invention defined in claim 1 wherein said means for yieldingly supporting said supporting roller members are pneumatically actuated.

3. The invention defined in claim 1 wherein said means yieldingly supporting said supporting roller means includes flexible walled chamber means.

4. The invention defined in claim 3 wherein said chamber means is pneumatically actuated.

5. The invention defined in claim 1 wherein said means yieldingly supporting said supporting member includes flexible hose means.

6. The invention defined in claim 5 wherein said hose means is coupled to a source of pressure fluid.

7. The invention defined in claim 1 wherein at least one of said first and second roller means is coupled to a source of power for imparting rotary motion thereto.

8. The invention defined in claim 1 wherein said means yieldingly supporting roller means includes elastomeric cushioning material.

9. The invention defined in claim 1 wherein said means yieldingly supporting said supporting roller means includes spring means.

10. The invention defined in claim 1, wherein said means yieldably supporting each of the stub axles of said supporting roller means includes spaced apart channel members having pairs of vertically oriented slots therein, the pairs of slots being adapted to receive the oppositely disposed stub axles of said supporting roller means and guide vertical movement of the stub axles.

* * * * *